US011862850B2

(12) United States Patent
Yamashita et al.

(10) Patent No.: US 11,862,850 B2
(45) Date of Patent: Jan. 2, 2024

(54) WIRELESS COMMUNICATION DEVICE

(71) Applicant: DENSO CORPORATION, Kariya (JP)

(72) Inventors: Takuya Yamashita, Kariya (JP); Shiro Koide, Kariya (JP)

(73) Assignee: DENSO CORPORATION, Kariya (JP)

(*) Notice: Subject to any disclaimer, the term of this patent is extended or adjusted under 35 U.S.C. 154(b) by 345 days.

(21) Appl. No.: 17/381,864

(22) Filed: Jul. 21, 2021

(65) Prior Publication Data

US 2021/0359405 A1 Nov. 18, 2021

Related U.S. Application Data

(63) Continuation of application No. PCT/JP2020/002339, filed on Jan. 23, 2020.

(30) Foreign Application Priority Data

Jan. 25, 2019 (JP) ................................ 2019-011163
Jan. 21, 2020 (JP) ................................ 2020-007528

(51) Int. Cl.
*H01Q 1/52* (2006.01)
*H01Q 1/32* (2006.01)
*H01Q 9/42* (2006.01)

(52) U.S. Cl.
CPC ................ *H01Q 1/52* (2013.01); *H01Q 1/32* (2013.01); *H01Q 1/3291* (2013.01); *H01Q 9/42* (2013.01)

(58) Field of Classification Search
CPC .. H01Q 1/52; H01Q 1/32; H01Q 9/42; H01Q 1/3291
USPC .......................................................... 343/711
See application file for complete search history.

(56) References Cited

U.S. PATENT DOCUMENTS

| | | | | |
|---|---|---|---|---|
| 6,570,086 | B1 | 5/2003 | Shimoji et al. | |
| 9,614,271 | B2 * | 4/2017 | Nakano | H01Q 1/52 |
| 2003/0161132 | A1 | 8/2003 | Shimoji et al. | |
| 2015/0042528 | A1 | 2/2015 | Jung | |
| 2017/0062899 | A1 | 3/2017 | Takahashi et al. | |
| 2018/0184550 | A1 * | 6/2018 | Jenkins | H05K 3/10 |
| 2019/0280372 | A1 | 9/2019 | Terashita et al. | |

FOREIGN PATENT DOCUMENTS

| | | | |
|---|---|---|---|
| JP | H07-288415 | A | 10/1995 |
| JP | H0946125 | A | 2/1997 |
| JP | H11308147 | A | 11/1999 |
| JP | 2006245869 | A | 9/2006 |
| JP | 2016045399 | A | 4/2016 |
| JP | 2017046215 | A | 3/2017 |
| JP | 2018137824 | A | 8/2018 |
| WO | WO-0195687 | A1 | 12/2001 |

* cited by examiner

*Primary Examiner* — Khai M Nguyen
(74) *Attorney, Agent, or Firm* — Harness, Dickey & Pierce, P.L.C.

(57) ABSTRACT

A wireless communication device includes an antenna, a communication module and a shield case. The antenna is disposed on an antenna board. The communication module is connected to the antenna and executes a wireless communication. The shield case stores the communication module inside the shield case. The antenna board is disposed to be in thermal contact with the shield case.

9 Claims, 6 Drawing Sheets

WIRELESS COMMUNICATION DEVICE

CROSS REFERENCE TO RELATED APPLICATIONS

The present application is a continuation application of International Patent Application No. PCT/JP2020/002339 filed on Jan. 23, 2020, which designated the U.S. and claims the benefit of priority from Japanese Patent Application No. 2019-11163 filed on Jan. 25, 2019 and Japanese Patent Application No. 2020-7528 filed on Jan. 21, 2020. The entire disclosures of all of the above applications are incorporated herein by reference.

TECHNICAL FIELD

The present disclosure relates to a wireless communication device.

BACKGROUND

A wireless communication device, which may be mounted on a vehicle or the like and executes wireless communication through an antenna, has a portion that generates heat through communication processing.

SUMMARY

The present disclosure describes a wireless communication device including an antenna, a communication module for executing wireless communication, and a shield case.

BRIEF DESCRIPTION OF DRAWINGS

Objects, features and advantages of the present disclosure will become more apparent from the following detailed description made with reference to the accompanying drawings. In the drawings.

DETAILED DESCRIPTION

In a situation where a wireless communication device dissipates heat, it is common to bring a heat source into contact with a member having a large heat capacity to conduct heat.

However, communication devices mounted on vehicles have been demanded to be miniaturized due to space restrictions. In general, in a device sign procedure, functional components are arranged firstly, and heat dissipation countermeasure are performed after the arrangement of functional components. Therefore, heat conductive members or heat dissipating members are added later, and it is necessary to consider enlarging the product size depending on the parts to which these members are added.

A wireless communication device according to an aspect of the present disclosure includes: an antenna that is disposed on an antenna board; a communication module that executes wireless communication; and a shield case that stores the communication module inside the shield case. The antenna board is disposed to be in thermal contact with the shield case. According to such a configuration, the heat generated by the communication processing through the communication module is conducted to the antenna board through the shield case. Therefore, it is possible that the antenna board and the antenna provide contribution to heat dissipation. As the antenna board and the shield case are stacked, the wireless communication device can be miniaturized by efficiently forming a three dimensional structure.

In the wireless communication device according to the above aspect of the present disclosure, the heat dissipation efficiency can be further enhanced by adopting a ceramic antenna having enhanced heat conductivity as the antenna.

The following describes multiple embodiments with reference to the drawings. Hereinafter, in the respective embodiments, substantially the same configurations are denoted by identical symbols, and repetitive description will be omitted.

First Embodiment

Figure 1:
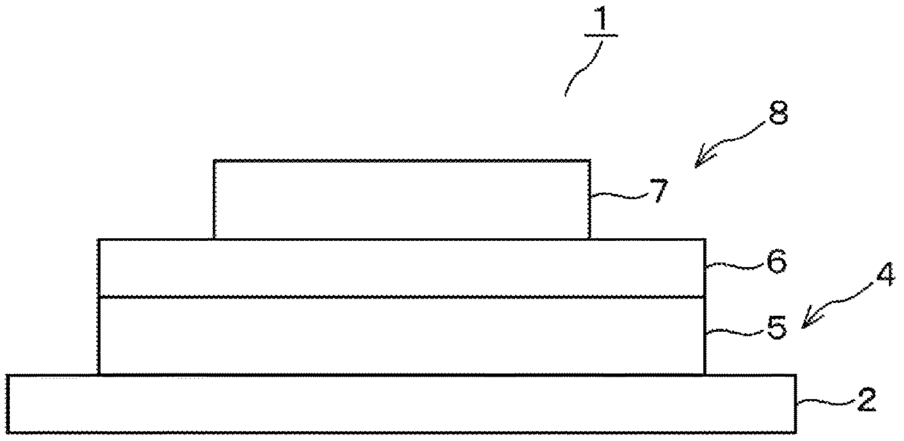
FIG. 1 is a side view schematically showing a configuration of a wireless communication device according to a first embodiment.

As illustrated in FIG. 1, a wireless communication device 1 according to a first embodiment of the present embodiment is mounted on, for example, a vehicle. The wireless communication device 1 includes a communication unit 4 having an NAD (Network Access Device) 3 corresponding to a communication module. The communication unit 4 is disposed on a board 2. The NAD 3 is stored inside a shield case 5 made of metal. An antenna portion 8 including an antenna board 6 and a patch antenna 7 is disposed above the shield case 5. The patch antenna 7 is, for example, a ceramic antenna and is used for wireless communication for GPS (Global Positioning System).

Figure 2:
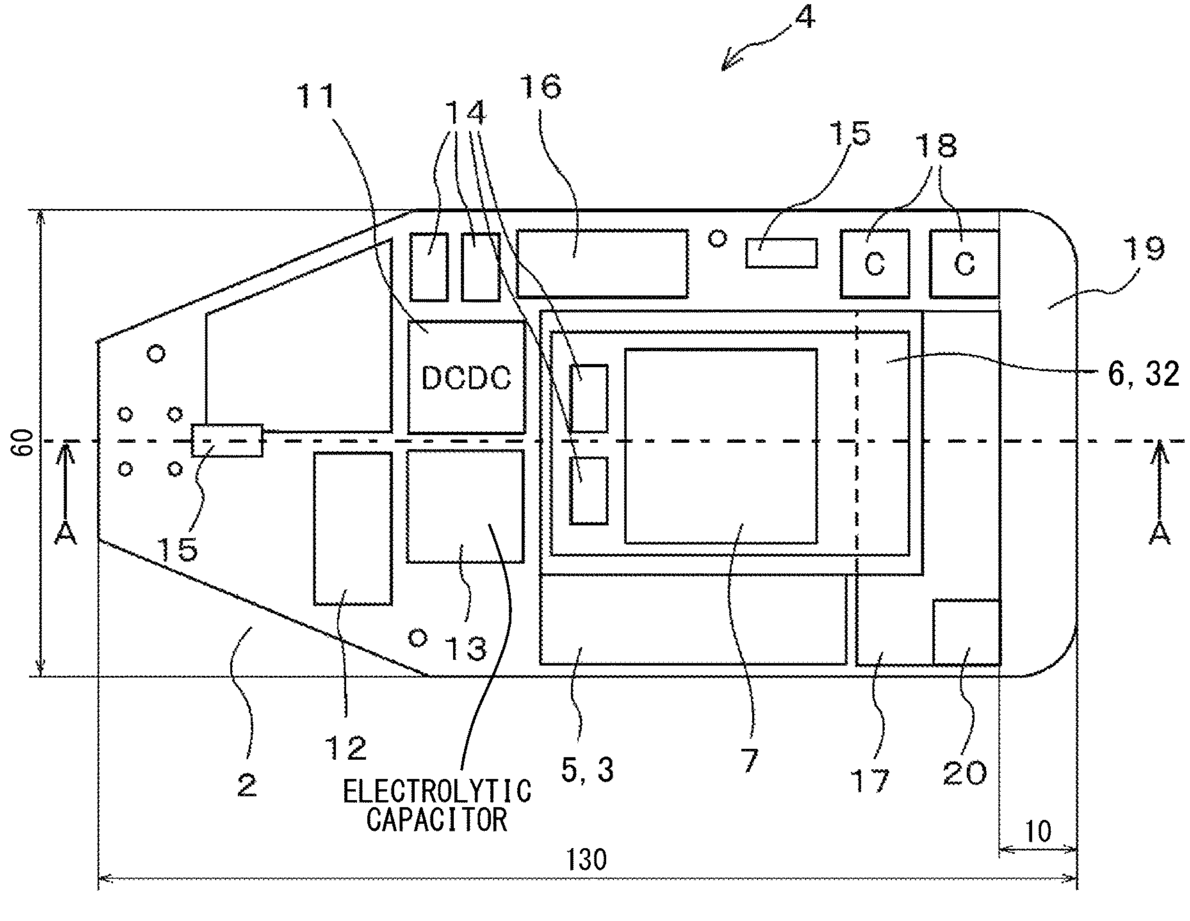
FIG. 2 is a plan view showing a communication module.

As illustrated in FIG. 2, on the board 2, other peripheral circuits of the NAD 3 including DC-DC converter 11, a battery backup manager 12, an electrolytic capacitor 13, a coaxial connector 14, a telephone antenna 15, a CAN (trademark) transceiver 16, a BLE (Bluetooth Low Energy: trademark) unit 17, a capacitor 18, an antenna 19 for BLE and V2X as inter-vehicle communication, diplexer 20, and LNA (Low Noise Amp, not shown) mounted on the board 2.

The shield case 5 is connected to a circuit ground of the NAD 3. A ground at the antenna side is disposed on the antenna board 6, and the antenna board 6 and the shield case 5 are electrically connected. Therefore, the ground at the antenna side and the circuit ground of the NAD 3 are connected. Along with this arrangement, the antenna board 6 and the shield case 5 are thermally connected, the heat generated by the communication processing through the NAD 3 is conducted in a path from the circuit ground, the shield case 5, the antenna board 6, the ground at the antenna side and the patch antenna 7 in order, and is then dissipated.

The wireless communication device 1 is stored inside, for example, a shark fin (not shown) arranged on a roof of the vehicle.

Figure 3:
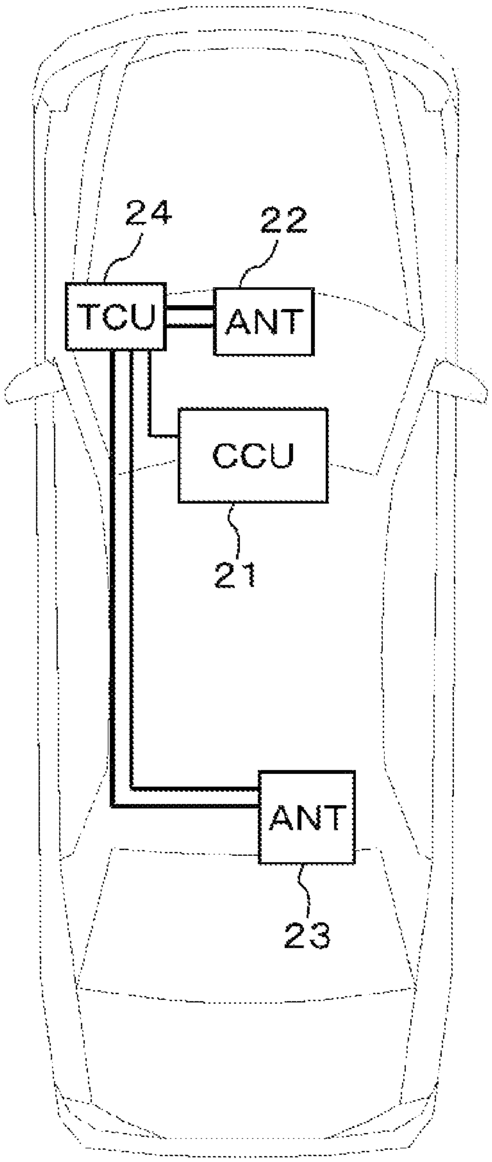
FIG. 3 mainly illustrates an arrangement state of a wireless communication device and an antenna in a comparative vehicle.
Figure 4:
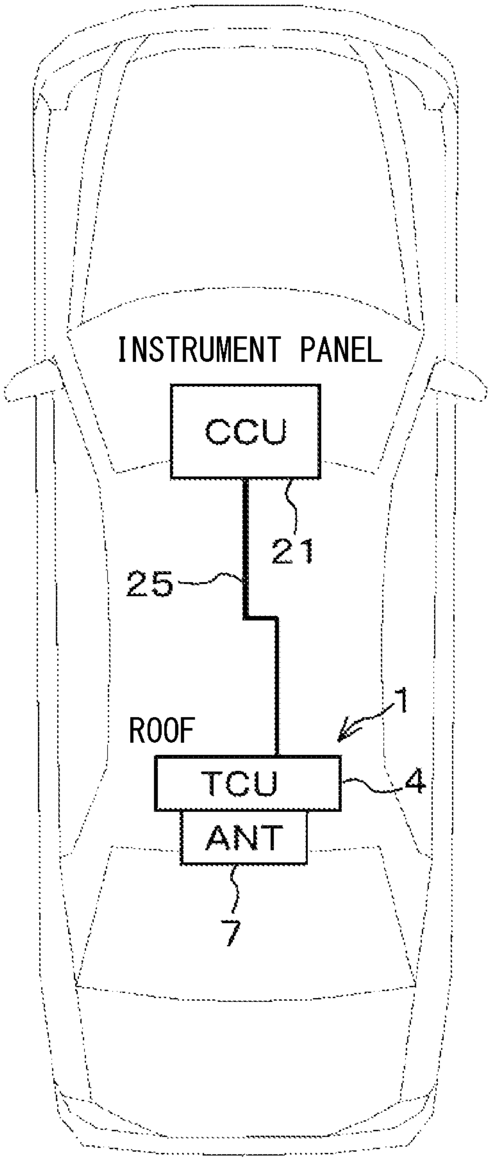
FIG. 4 mainly illustrates an arrangement state of a wireless communication device and an antenna in a vehicle according to the first embodiment.

As illustrated in FIG. 3, in a comparative configuration, a CCU (Center Console Unit) 21 is disposed inside an instrument panel of a vehicle, multiple wiring cables are needed for interconnecting the GPS and telephone communication antenna 22 disposed at the front side of the vehicle, an additional telephone communication antenna 23 disposed at the rear side of the vehicle, and a TCU communication unit 24. On the other hand, as illustrated in FIG. 4, in the wireless communication device 1 according to the present embodiment, since the communication unit 4, which are equipped with a telephone antenna 15 and the antenna 19 for BLE and V2X, and the patch antenna 7 are integrally formed, the connection with the CCU 21 may be done by only a single wiring cable 25.

As described above, according to the present embodiment, the wireless communication device 1 includes the patch antenna 7 formed on the antenna board 6, the NAD 3 connected to the patch antenna 7 for executing the wireless communication and the shield case 5 for storing the NAD 3 inside the shield case 5. The antenna board 3 is arranged to be in thermal contact with the shield case 5.

Since the heat generated by the communication processing through the NAD 3 is conducted to the antenna board 6 through the shield case 5, it is possible that the antenna board 6 and the patch antenna 7 provide contribution to heat dissipation. As the antenna board 6 and the shield case 5 are stacked, it is possible to efficiently form a three-dimensional structure and miniaturize the wireless communication device 1. Since a ceramic antenna with enhanced heat conductivity is adopted as the patch antenna 7, it is possible to enhance the efficiency of heat dissipation.

Second Embodiment

Figure 5:
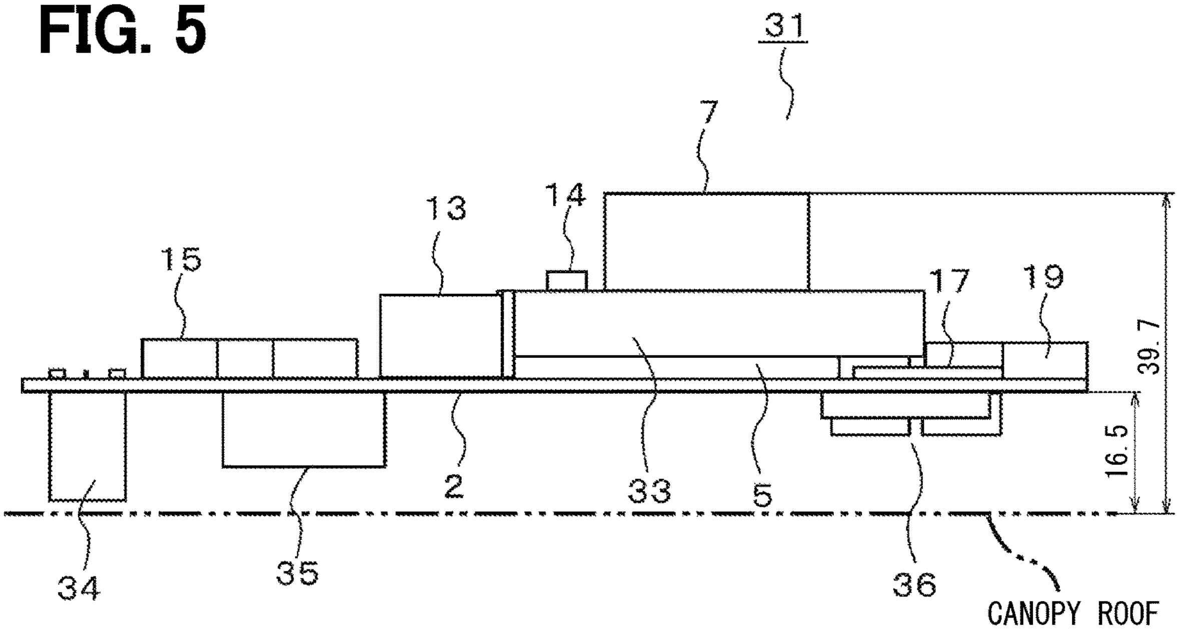
FIG. 5 is a side view of the configuration of a wireless communication device according to a second embodiment.
Figure 6:
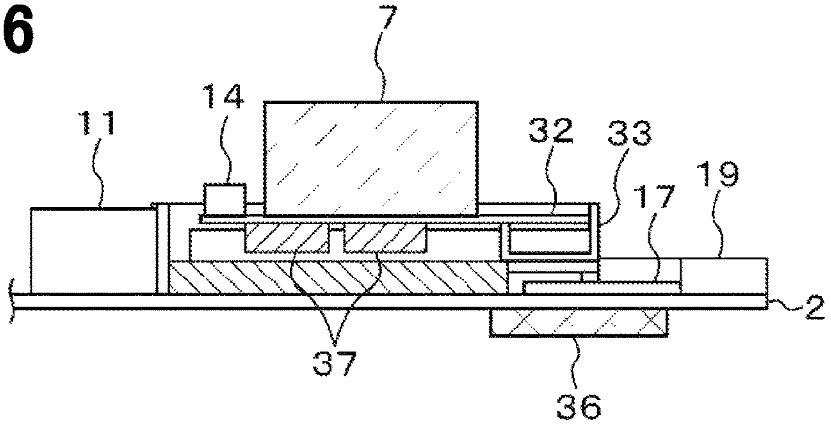
FIG. 6 is a sectional view taken along a line A-A of FIG. 2.

Hereinafter, the same components as those of the first embodiment are denoted by the same reference numerals, and descriptions of the same components will be omitted, and different portions will be described. As illustrated in FIGS. 5 and 6, in a wireless communication device 31 according to the second embodiment, an antenna board 32, which is in replacement of the antenna board 6, is stored inside an antenna shield 33 made of metal. The antenna shield 33 is connected to the ground at the antenna side. The antenna shield 33 is electrically and thermally in contact with the shield case 5.

As shown in FIG. 5, respective connectors 34 and 35 for cable connection and antenna connection and a Bluetooth unit 36 for Bluetooth (registered trademark) are mounted on the rear surface of the substrate 2. A canopy roof of the vehicle is below these components, and is indicated by a dashed two-dotted line.

FIG. 6 corresponds to a part of the A-A cross sectional view of FIG. 2, but the configuration according to the first embodiment does not include the antenna shield 33. As illustrated in FIG. 6, multiple LNAs 37 are mounted on the antenna board 32 at the other side of the surface of the antenna board 32 where the patch antenna 7 is disposed.

According to the second embodiment as described above, since the antenna board 32 includes the antenna shield 33 disposed at the surface of the antenna board 32 opposing the shield case 5, it is possible to dissipate heat efficiently.

Third Embodiment

Figure 7:
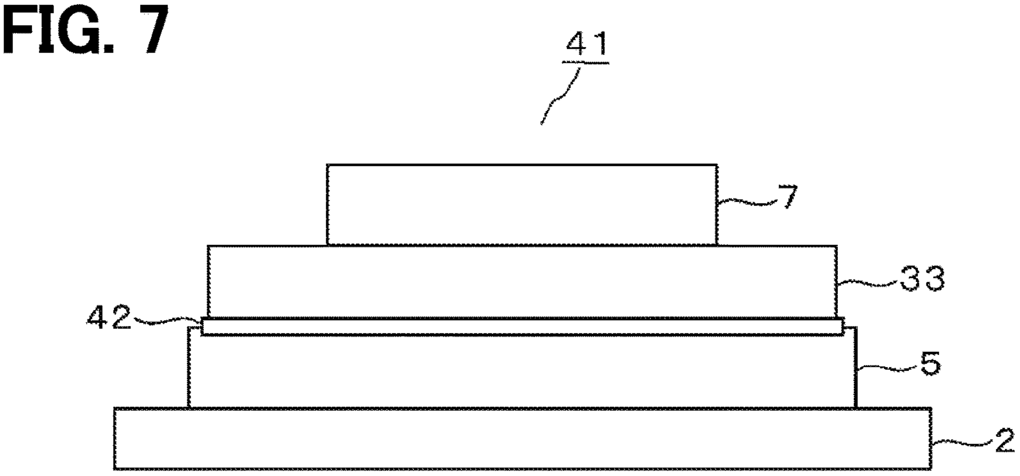
FIG. 7 is a side view schematically showing a configuration of a wireless communication device according to a third embodiment.

As illustrated in FIG. 7, a wireless communication device 41 according to a third embodiment includes a thermal and electrical conductive sheet 42, which corresponds to a heat conductive member between the antenna shield 33 and the shield case 5. As a result, the thermal conductivity from the shield case 5 to the antenna shield 33 is further enhanced.

Fourth Embodiment

Figure 8:
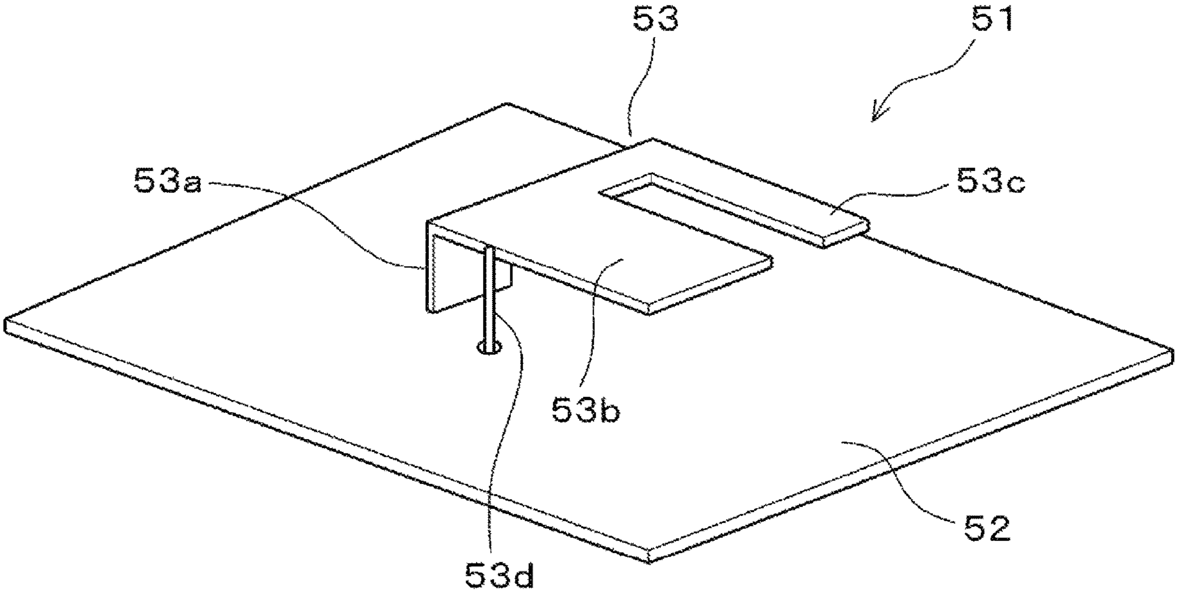
FIG. 8 is a perspective view that illustrates, in a fourth embodiment, an inverted-F antenna adopted in replacement of a patch antenna according to the second embodiment.

Fourth to seventh embodiments described in the following illustrate a situation where the patch antenna 7 in the wireless communication device 31 according to the second embodiment is replaced by an antenna with different structure. In the fourth embodiment shown in FIG. 8, the inverted-F antenna 51 is adopted. As is well known, the inverted-F antenna 51 has a configuration in which an “inverted-F” shaped antenna element 53 is connected to an antenna shield 52 which is a rectangular ground conductor plate. The antenna shield 52 is also the ground of the inverted-F antenna 51.

The antenna element 53 includes a connecting conductive plate 53*a*, a first radiating conductor plate 53*b*, a second radiating conductive plate 53*c*, and a feeding pin 53*d*. The connecting conductive plate 53*a* has one end connected to the antenna shield 52 perpendicularly. The first and second radiating conductive plates 53*b*, 53*c* are bent and extended at the right angle from the other end of the connecting conductive plate 53*a*, and sandwich a rectangular notch portion between the first and second radiating conductive plates 53*b*, 53*c*. The feeding pin 53 has one end connected to the feeding point at the rear surface side of the antenna shield 52, and has the other end penetrating through the hole of the antenna shield 52 and connected to the first radiating conductive plate 53*b*. The antenna shield 52 is electrically connected to the shield case 5.

Fifth Embodiment

Figure 9:
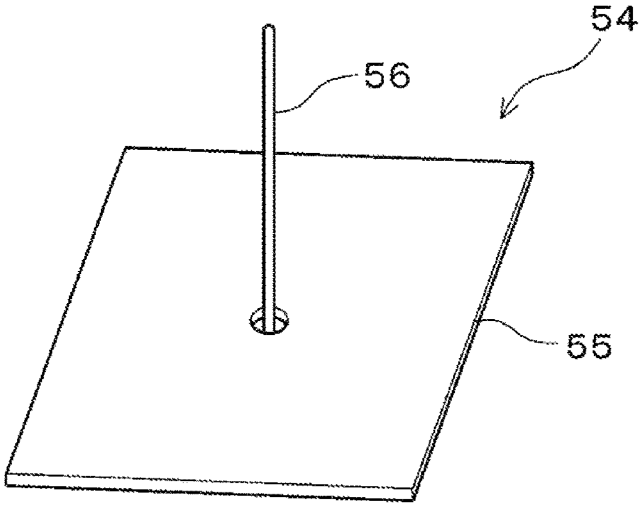
FIG. 9 is a perspective view that illustrates, in a fifth embodiment, a monopole antenna adopted in replacement of the patch antenna according to the second embodiment.

In the fifth embodiment shown in FIG. 9, the monopole antenna 54 is adopted. As is well known, the monopole antenna 54 includes an antenna shield 55 as a rectangular ground conductive plate and a rod-shaped antenna element 56. The antenna shield 55 may also be the ground of the antenna 54. The antenna element 56 has one end connected to a feeding point at the rear surface side of the antenna shield 55, and has the other end protruding to the main surface side of the antenna shield 55 through a hole of the antenna shield 55. The antenna shield 55 is electrically connected to the shield case 5.

Sixth Embodiment

Figure 10:
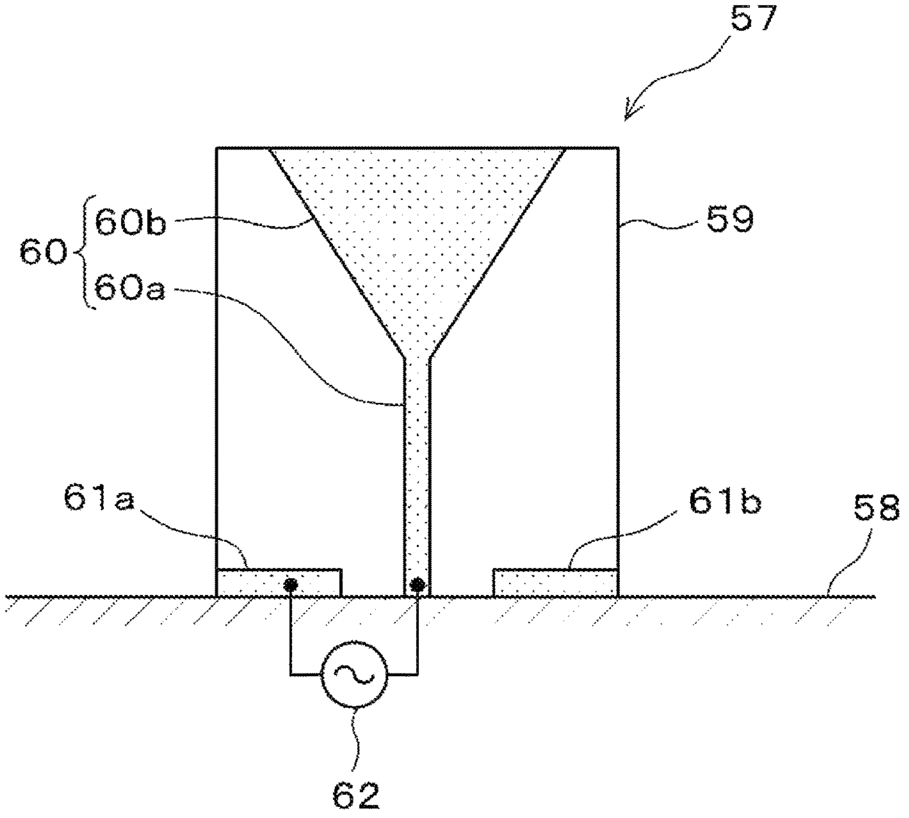
FIG. 10 is a front view that illustrates, in a sixth embodiment, a pattern antenna adopted in replacement of the patch antenna according to the second embodiment.

In the sixth embodiment illustrated in FIG. 10, a pattern antenna 57 is adopted. The pattern antenna 57 is formed by arranging patterns 60, 61 of a metal material such as copper at one surface of the antenna board 59 erected on an antenna shield 58 as a flat ground conductor plate. The antenna board 59 is a glass epoxy resin such as FR4. The antenna pattern 60 includes a linear pattern 60*a* having one end being in contact with the antenna shield 58, and a fan-shaped pattern 60*b* spreading out from the other end of the linear pattern 60*a* in a direction to the an upper part of the drawing.

Foot patterns 61*a* and 61*b* are disposed at a lower side of the antenna board 59, and are respectively at both sides of the antenna board 59 with the linear pattern 60*a* in between. The foot patterns 61*a*, 61*b* are also connected to the antenna shield 58 by, for example, soldering. A signal source 62 is connected between the foot pattern 61*a* and the linear pattern 60*a*. The antenna shield 58 is also the ground of the pattern antenna 57, and is electrically connected to the shield case 5.

Seventh Embodiment

Figure 11:
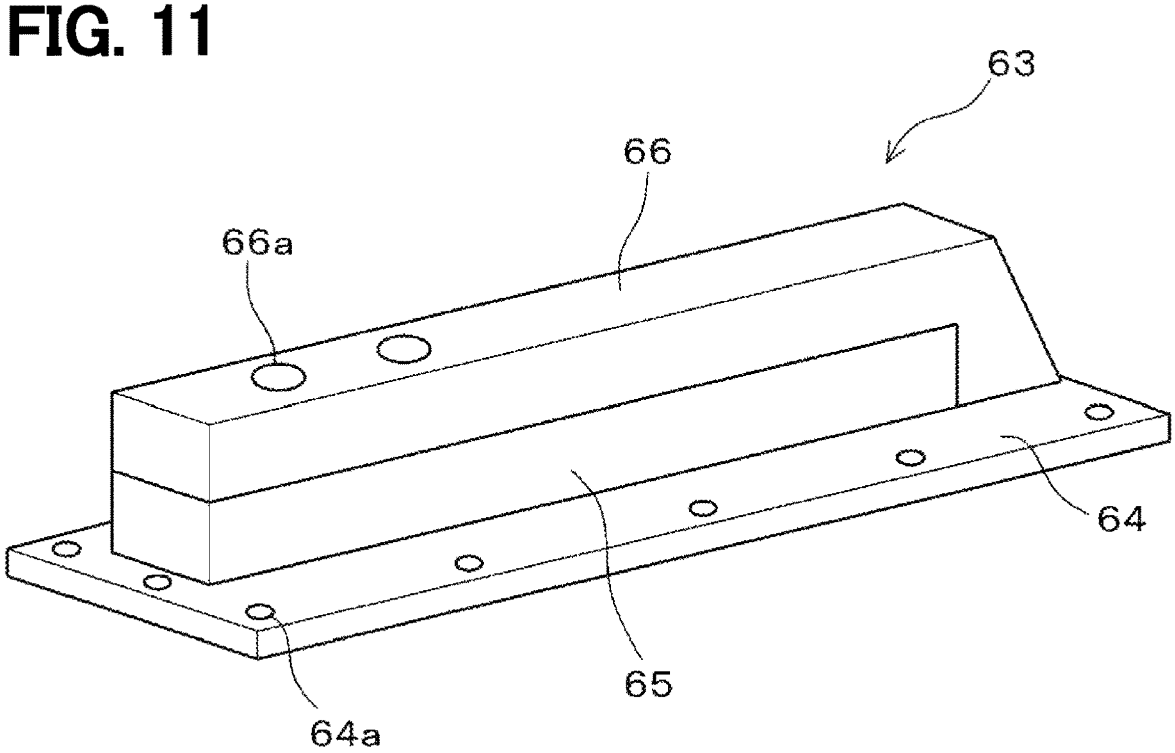
FIG. 11 is a perspective view that illustrates, in a seventh embodiment, a dielectric holding antenna adopted in replacement of the patch antenna according to the second embodiment.

In a seventh embodiment illustrated in FIG. 11, a dielectric holding antenna 63 is adopted. The dielectric holding antenna 63 is formed by stacking a rectangular dielectric 65 and substantially rectangular antenna element 66 on an antenna shield 64 as a rectangular ground conductive plate. The dielectric 65 is, for example, ABS resin or polycarbonate. The antenna element 66 has one end that extends from one end of the dielectric 65 to the bottom side of the drawing, and that is connected to the antenna shield 64.

The antenna shield 64 is also the ground of the dielectric holding antenna 63, and is electrically connected to the shield case 5. Multiple screw holes 64*a*, which are for connecting and fixing to the shield case 5 with screws (not shown), are formed at the antenna shield 64. Additionally, multiple screw holes 66*a*, which are also for connecting and fixing to the dielectric 65, are formed at the antenna element 66. Since the dielectric holding antenna 63 has the dielectric 65 having a relatively large heat capacity, the heat generated by the communication processing through the NAD 3 can be dissipated efficiently.

Other Embodiments

The patch antenna 7 is not limited to the ceramic antenna.

The communication module is not limited to NAD 3. Further, the peripheral circuit of NAD 3 may be appropriately modified according to the individual design. In the second embodiment, the LNA 34 may be mounted on the same surface as the patch antenna 7. A fan 35 may be provided if necessary. The wireless communication device is not limited to be equipped into a vehicle. The configuration of the first and third embodiments may be applied to the fourth to seventh embodiments.

Although the present disclosure has been described in accordance with the examples, it is understood that the present disclosure is not limited to such examples or structures. The present disclosure encompasses various modifications and variations within the scope of equivalents. In addition, various combinations and forms, and further, other combinations and forms including only one element, or more or less than these elements are also within the scope and the scope of the present disclosure.

What is claimed is:

1. A wireless communication device comprising:
an antenna disposed on an antenna board;
a communication module configured to be connected to the antenna, and configured to execute a wireless communication; and
a shield case configured to store the communication module inside the shield case,
wherein the antenna board is disposed to be in thermal contact with the shield case.

2. The wireless communication device according to claim 1, further comprising:
an antenna shield disposed at an opposite surface of the antenna board opposing the shield case.

3. The wireless communication device according to claim 2, further comprising:
a heat conductive member disposed between the antenna shield and the shield case.

4. The wireless communication device according to claim 2,
wherein the antenna shield is connected to a ground of the antenna board, and
wherein the shield case is electrically connected to the antenna shield.

5. The wireless communication device according to claim 1,
wherein the antenna is a ceramic antenna.

6. The wireless communication device according to claim 1,
wherein the antenna is an inverted-F antenna.

7. The wireless communication device according to claim 1,
wherein the antenna is a monopole antenna.

8. The wireless communication device according to claim 1,
wherein the antenna is a pattern antenna with a pattern having a metal material disposed on the antenna board.

9. The wireless communication device according to claim 1,
wherein the antenna is a dielectric holding antenna.

* * * * *